United States Patent
Ginzberg

(10) Patent No.: US 8,996,433 B2
(45) Date of Patent: Mar. 31, 2015

(54) AUTOMATED NATURAL LANGUAGE FORMULA TRANSLATOR AND DATA EVALUATOR

(76) Inventor: Steven Ginzberg, New York, NY (US)

( * ) Notice: Subject to any disclaimer, the term of this patent is extended or adjusted under 35 U.S.C. 154(b) by 907 days.

(21) Appl. No.: 12/287,600

(22) Filed: Oct. 10, 2008

(65) Prior Publication Data

US 2009/0112787 A1    Apr. 30, 2009

Related U.S. Application Data

(60) Provisional application No. 60/979,313, filed on Oct. 11, 2007.

(51) Int. Cl.
  *G06F 17/24* (2006.01)
  *G06N 5/02* (2006.01)
(52) U.S. Cl.
  CPC .............. *G06F 17/246* (2013.01); *G06N 5/025* (2013.01)
  USPC ......................................................... 706/45
(58) Field of Classification Search
  USPC ..................................................... 706/47, 45
  See application file for complete search history.

(56) References Cited

U.S. PATENT DOCUMENTS

| | | | | |
|---|---|---|---|---|
| 4,920,499 | A * | 4/1990 | Skeirik ............................ | 706/11 |
| 5,109,509 | A * | 4/1992 | Katayama et al. ................ | 704/9 |
| 2005/0071150 | A1* | 3/2005 | Nasypny ........................... | 704/9 |
| 2006/0026576 | A1* | 2/2006 | Baisley et al. ................. | 717/143 |
| 2007/0244847 | A1* | 10/2007 | Au ................................... | 706/55 |
| 2008/0104092 | A1* | 5/2008 | Cummins ..................... | 707/101 |
| 2008/0215517 | A1* | 9/2008 | Johnson et al. ................. | 706/47 |

OTHER PUBLICATIONS

A. Biermann and B. Ballard, "Toward Natural Language Computation", Am. J. of Computational Linguistics, vol. 6, No. 2, Apr.-Jun. 1980, pp. 71-86.*
D. Kosy and B. Wise, "Self-Explanatory Financial Planning Models", AAAI-84, Proc., pp. 176-81 (1984).*

* cited by examiner

*Primary Examiner* — Kakali Chaki
*Assistant Examiner* — Vincent Gonzales
(74) *Attorney, Agent, or Firm* — Tarter Krinsky & Drogin LLP

(57) ABSTRACT

A method is provided wherein natural-language formulas are translated to obtain structured expressions or rules. When a query is received requiring analysis of data, the rules are evaluated to obtain a solution. The evaluation includes: obtaining the solution from a stack of existing solutions; searching a database of rule definitions if the solution is not available from the stack; calculating a solution using an explicit definition for each rule and the data, if the explicit definition is available for a given rule; calculating a solution using an implicit definition for each rule and the data, if the explicit definition is not available; and determining a best solution according to a predefined priority of data types. The solution is then supplied to an output format, such as a spreadsheet. The rules are received from a plurality of files, include descriptive variable names, and are applied to all cells in the spreadsheet.

21 Claims, 7 Drawing Sheets

FIG. 6

RulesBase—[Partnership Allocation Example.gbw]

File  Edit  Rules  Window  Help

New  Rule  Results  Grid  Open  Save  Wkspc  Save All  Print  Cut  Copy  Paste  Help Partnership Allo...ple—Rules.gbr | Partnership Allocation Example.gbr Variables  Add

| | Rule |
|---|---|
| 1 | 'Base Rules for Partnership Allocation |
| 2 | 'Calculate Ownership percentages |
| 3 | Base Ownership Percentage = pct(Partner Capital) |
| 4 | Carried Interest Pct = pct(Partner Capital.Does Partner get Carrier Interest) |
| 5 | 'Formulas to Distribute Investment Proceeds and Calculate Gain |
| 6 | GP Distribution = Distribution Proceeds * General Partner Pct |
| 7 | Partner Distributions = GP Distribution * Base Ownership Percentage |
| 8 | Total Gain = Distribution Proceeds − Cost Basis |
| 9 | 'Calculate Gain and Promote |
| 10 | GP Gain = Total Gain * General Partner Pct |
| 11 | Total Carried Interest = (Total Gain − GP Gain) * 20% |
| 12 | Partner CI Distribution = Carried Interest Pct * Total Carried Interest |
| 13 | Partner Total Distribution = Partner Distributions * Partner CI Distribution |
| 14 | 'Base Capital Account Inputs |
| 15 | Partner Name = {Alan, Bob, Carl, David, Eric, Frank} |
| 16 | Partner Capital = (400, 500, 50, 20, 100, 10) |
| 17 | Gets Carried Interest = {Alan, Bob, Carl} |
| 18 | Does Partner get Carried Interest = Partner Name in Gets Carried Interest |
| 19 | 'Distribution Information |
| 20 | Distribution Proceeds = 1000000 |
| 21 | Cost Basic = 150000 |
| 22 | General Partner Pct = 1% |

| Partner Name | Alan | Bob | Carl | David | Eric | Franki | |
|---|---|---|---|---|---|---|---|
| Partner Capital | 400 | 500 | 50 | 20 | 100 | 10 | 1,080 |
| Base Ownership Percentage | 37.037% | 46.296% | 4.630% | 1.852% | 9.259% | 0.926% | 100.00% |
| Does Partner get Carried Interest | True | True | True | False | False | False | True |
| Partner Distributions | 3,704 | 4,630 | 463 | 185 | 926 | 93 | 10,000 |
| Partner CI Distribution | 70,863 | 88,579 | 8,858 | 0 | 0 | 0 | 168,300 |
| Partner Total Distribution | 74,567 | 93,209 | 9,321 | 185 | 926 | 93 | 178,300 |

FIG.7

AUTOMATED NATURAL LANGUAGE FORMULA TRANSLATOR AND DATA EVALUATOR

RELATED APPLICATION

This application claims priority from Provisional Application Ser. No. 60/979,313 filed Oct. 11, 2007, the content of which is incorporated herein its entirety.

BACKGROUND OF THE INVENTION

1. Field of the Invention

The invention generally relates to financial analysis and, more particularly, to a method for creating and processing data and other information using natural language formulas.

2. Description of the Related Art

Spreadsheets are commonly employed in performing financial (numerical) analysis. In a typical spreadsheet program, such as Microsoft's Excel® program, a user creates formulas and inputs data into a spreadsheet template on a cell-by-cell basis. While this cell-by-cell spreadsheet allows a great deal of flexibility, maintaining data and equations within the individual cells has many significant limitations and disadvantages.

One disadvantage of a typical spreadsheet program is that it is complicated and cumbersome to create formulas for individual cells. For example, formulas in spreadsheet programs typically refer to other cell locations. As a result, formulas must be checked and updated whenever the referenced cells are moved, modified, amended, deleted or supplemented. In addition, the cell-by-cell format requires considerable storage space, even when the formula is the same for each cell.

It is also difficult to maintain historical changes when using a spreadsheet, whether in paper or electronic format. When records are kept electronically, one must maintain the cell-by-cell formatted equations and the data that is referenced therein (which may be stored in separate spreadsheets or other electronic files). Thus, when creating complex financial analyses, with multiple what-if? type scenarios, maintenance of this information becomes inefficient, complex and costly. Likewise, it is no easy task to generate or maintain paper copies of such information, since multiple paper files would need to be printed (the spreadsheet must be printed in a manner that reveals the equations, the spreadsheet must be printed in a manner that shows the results, and all of the referenced data must be printed). At present, spreadsheets do not store cell-by-cell formulas in databases for the same reason.

Reviewing and updating a spreadsheet is often burdensome for the user. While it is possible to print and review spreadsheet formulas, the user must then contend with many pages of detail. Furthermore, a spreadsheet's cell-by-cell technology requires the user to change the formula as the source data changes. For instance, if an analysis requires 100 rows, and a new set of data is 120 rows, spreadsheet users typically must manually manipulate all of the dependent formulas. Obviously, this is a time consuming and error prone process.

SUMMARY OF THE INVENTION

In accordance with the present disclosure, natural language formulas (rules) are translated and evaluated using a natural-language translator and an evaluation engine. These rules are used to calculate results presented in user defined output, such as grids, charts, etc.

In accordance with the disclosure, a method is provided in which a plurality of natural-language formulas are received from a user, and those formulas are translated to obtain structured expressions characterized as rules. When a query is received from a user requiring analysis of data in accordance with the rules, the rules are evaluated to obtain a solution. This evaluation process includes: obtaining the solution from a stack of existing solutions; searching a database of rule definitions if the solution is not available from the stack of existing solutions; calculating a solution using an explicit definition for each rule and the data, if the explicit definition is available for a given rule; calculating a solution using an implicit definition for each rule and the data, if the explicit definition is not available; and determining a best solution in accordance with a predefined priority of data types. The solution is then applied to a user-defined output format, such as a grid (spreadsheet). In accordance with the disclosure, the rules are received from a plurality of files, include descriptive variable names, and are applied to all calculations requesting such information.

The foregoing has broadly outlined the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

BRIEF DESCRIPTION OF THE DRAWINGS

The foregoing and other advantages and features of the invention will become more apparent from the detailed description of the preferred embodiments of the invention given below with reference to the accompanying drawings in which:

FIGS. 6 and 7 illustrate exemplary screenshots of rules and results of applying the rules constructed according to an embodiment of the disclosure.

DETAILED DESCRIPTION OF THE EXEMPLARY EMBODIMENTS

Figure 1:
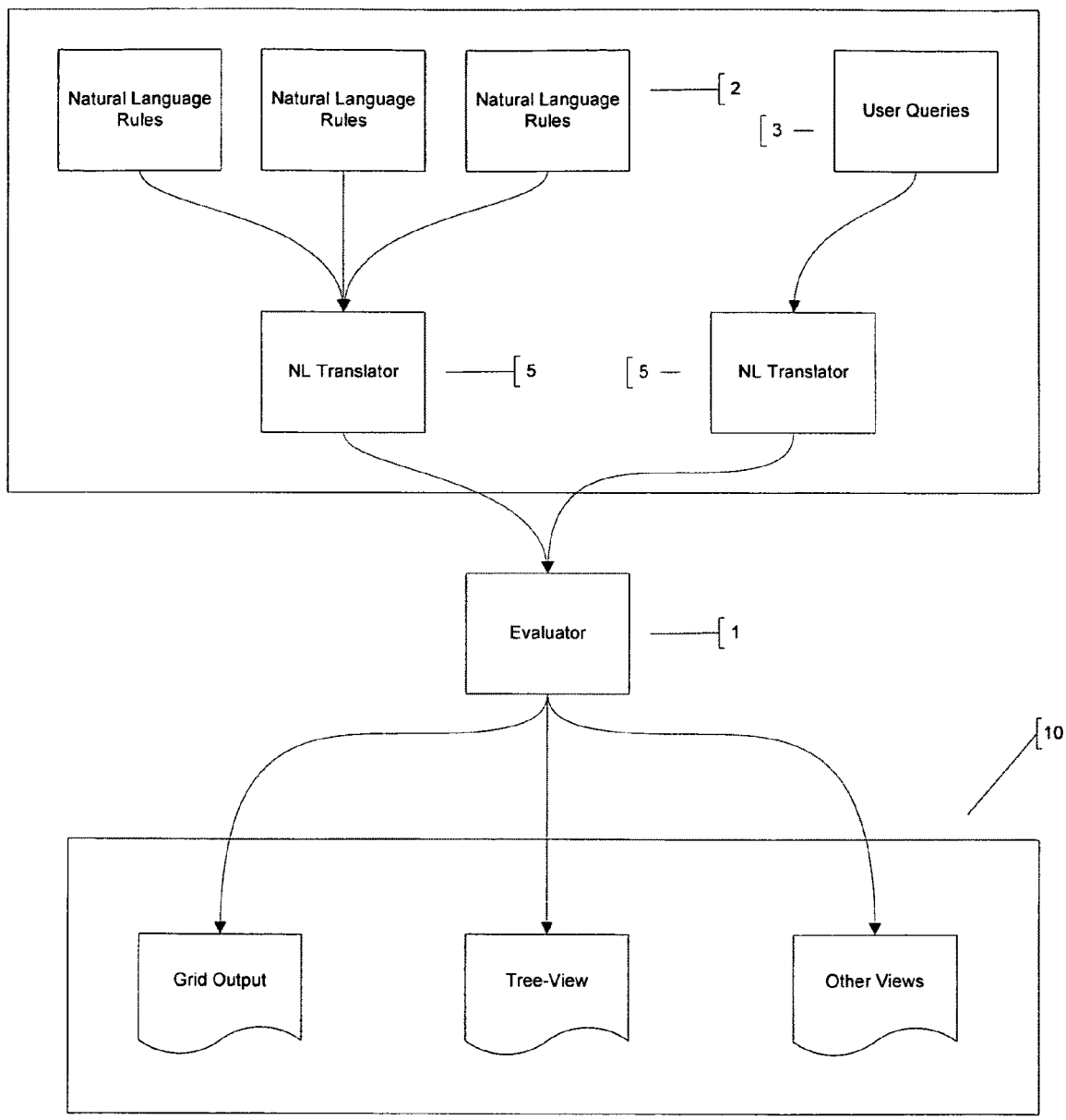
FIG. 1 is a schematic illustration of a system for evaluating rules and queries, in accordance with an embodiment of the disclosure.

A system embodying the disclosure is shown schematically in FIG. 1. The central component of the system is the evaluator 1, which accepts rules and queries 3 (user requests) as input, and provides the results 10 as output. A natural language (NL) translator 5 converts natural-language rules 2 and queries 3, which are English-like expressions, into structured forms of rules and queries for input to the evaluator 1. Other components (not shown) in FIG. 1, may include file management classes, database and Excel-link classes, and user interface components associated with those classes, as understood by those skilled in the art.

In an embodiment of the disclosure, the NL translator 5 accepts the user text as input and provides a structured expression to the evaluator 1. In contrast to conventional expert systems, in which rules are created in a specialized programming language (and in which the "expert" is required to develop the rules with the aid of a programmer), the NL translator 5 and evaluator 1 work in a structured form of English and in a fully automated process. The NL translator 5 provides an important bridge between natural language, which can be notoriously imprecise, and the mathematical precision required by the evaluator. In addition, the NL translator 5 provides tools to identify potential misinterpretation before the evaluator 1 has a chance to work with incorrect language. For example, the NL translator 5 provides the order of precedence (evaluation order) of the expression as the translator has understood it. Thus the expression $x=y+4*2$ would be viewed as $(x=(y+(4*2)))$—the multiplication is performed first, based on standard mathematical precedence, then the addition and finally the equality assignment. Proper interpretation of expressions becomes more important as mathematical, logical and other operators are added. The standard evaluation order is typically pre-defined and stored in the system, or the user may define the default precedence.

In an embodiment, the NL translator software 5 uses a pattern matching routine to convert the English text into expressions understood by the evaluator. The main translator routine searches for the text pattern required for the least significant operators. As each pattern fails, the routine continues searching to match the defined pattern for each subsequent operator from least significant precedence to highest precedence. The result is each expression and each sub-expression is processed into an expression that the evaluator 1 can then understand.

In one embodiment, the evaluator 1 includes characteristics of a backward-chaining inference engine, but differs from a typical backward-chaining inference engine in at least two respects: First, the evaluator does not infer a solution if an explicit solution exists. Second, if multiple rules provide definitions, only the best result will be returned and all others will be discarded (in one embodiment, by a process discussed below with reference to FIG. 4). Accordingly, the calculations performed by the evaluator are significantly faster to process than existing inference technology, and provide a predictable result for the user.

The evaluator 1 accepts as inputs all of the rules required for an analysis (rules containing either or both logic and data). As shown schematically in FIG. 2, rules may be input from a variety of sources, e.g. from a memory or storage device, such as a disk file 21, from an existing database 22, from a spreadsheet 23, or by the user. The evaluator 1 may then be called (or queried) with any variable, expression, etc.

Figure 3:
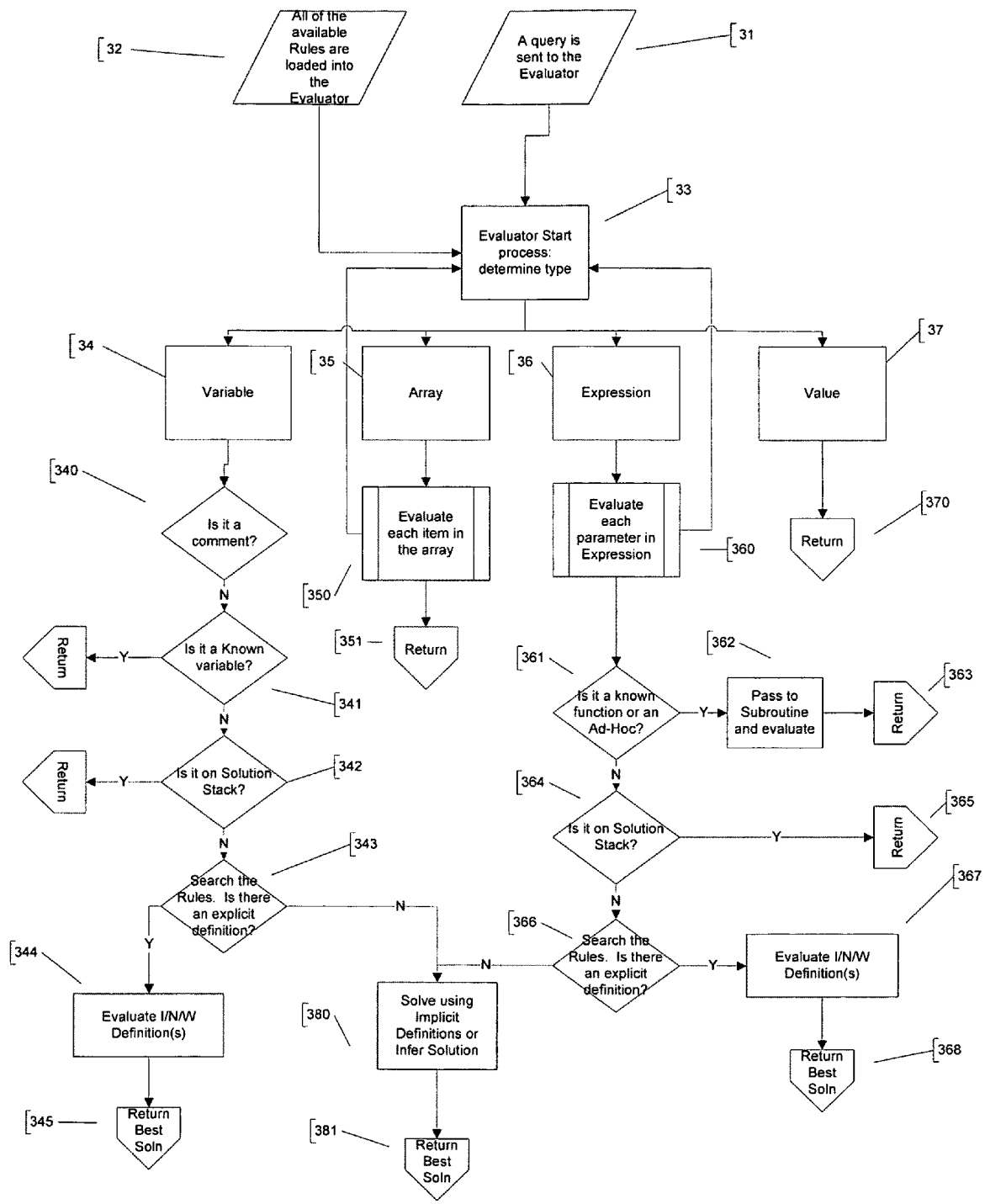
FIG. 3 is a flowchart illustrating a process for evaluating rules and queries, in accordance with an embodiment of the disclosure.

Steps in a rules-based analysis performed by the evaluator 1 in response to a query, in accordance with an embodiment of the disclosure, are shown in the flowchart of FIG. 3. A query is sent to the evaluator (step 31), and the available rules are loaded into the evaluator (step 32). The evaluator begins the analysis by determining the type of data provided in the query (step 33). For example, the data may be a variable 34, an array 35, a functional expression 36, or a value 37. The subsequent steps will, in general, depend on the type of data provided in the query.

If the data type is a value 37 (including, for example, a numerical value, a true/false or Boolean value, a date, or a string) the evaluator simply returns the same value (step 370).

If the data type is an array 35, the evaluator evaluates each item in the array (step 350), and returns an array of the results (step 351).

Each variable name 34 that is not merely a comment (step 340) must be associated with a value. If the variable is a known variable (step 341), that value is returned. In most cases, a variable 34 or expression 36 must have a value or formula defined; the evaluator proceeds to search for a definition. In other cases, variables and functions have values and/or definitions that are built into the evaluator steps. For example, no search for a definition is performed for "today;" the evaluator merely returns a date equal to the system date.

If the variable is not recognized as having a built-in definition, the evaluator searches a stack of existing solutions (step 342). As the evaluator performs various search algorithms, every variable that is searched and solved is placed on a solution stack. The use of a solution stack avoids the need to recalculate or re-search for something that has already been solved; this in turn improves system performance. If a variable or parameter being searched exists on the solution stack, the value is retrieved from the stack and returned instead of being recalculated. The solution stack may be processed as needed or may be processed in a background thread and stored until needed.

If the variable is not found on the solution stack, then all of the rules are searched (step 343). Any rule that assigns a value to the variable via an explicit definition is solved (step 344), and the solution is placed on an interim solution stack. These assignments may be "equals" or conditional ("if . . . then"). The search term may appear on the left or right side of the equation. If the variable has multiple explicit definitions, each definition is evaluated; the best solution or solutions are returned by a process described in more detail below (step 345), and the rest are discarded. If the variable has no explicit definitions, the evaluator attempts to solve for the variable implicitly, or infer a solution (step 380), and returns the solution found (step 381). If no solution is found, the variable is returned as the result (step 382).

If the data type is an expression 36 (generally having parameters and operators), each parameter in the expression is evaluated (step 360). If an operator is known, the evaluator then checks to make sure the correct number and types of parameters are provided; passes the parameter values and operators to the appropriate subroutine to perform the calculation (step 362); and returns the result (step 363). If an operator is not recognized, the evaluator searches for the expression on the solution stack (step 364). If the expression exists on the solution stack, that solution is returned (step 365).

If the expression is not found on the solution stack, the evaluator searches the rules for an explicit definition of the expression. If an explicit definition is found (step 366), the expression is evaluated (step 367) and the result is returned (step 368) and also added to the solution stack. If no explicit definition is found, the evaluator attempts to solve the expression implicitly or infer a solution (step 380). If a solution is found, it is returned (step 381); otherwise, the expression is returned (step 382).

After all rules have been searched and all explicit definitions solved, the evaluator then determines if any solutions are better than the others. The evaluator returns the best solution and discards all the other incomplete solutions. For example, if there is a set of two rules, "x=3" and "x=y", the search routine solving for x will find both "3" and "y". The evaluator will return only "3", and discard the "y" because not enough information was provided to solve "y". However, if a rule "y=7" is added, the search routine will then result in an array of solutions {3, 7} and both solutions will be returned.

A number of benefits are available to the user with this approach. The system is configured such that if two rules provide solutions to the same variable (for example, two definitions in two different rules files), both are returned. In addition, it is easy for a user to merge data. For example, given the following rules in which:

Distribution={#4/1/07, 5000}
Distribution={#6/30/07, 6000}
Distribution={#12/31/07, 10000}

Solving for Distribution will return all solutions:

{{#4/1/07, 5000}, {#6/30/07, 6000}, {#12/31/07, 10000}}

This allows the user to manipulate Distribution as a single object rather than multiple objects. For example, Transpose (Distribution) will return:

{{#4/1/07, #6/30/07, #12/31/07}, {5000, 6000, 10000}}

Figure 4:
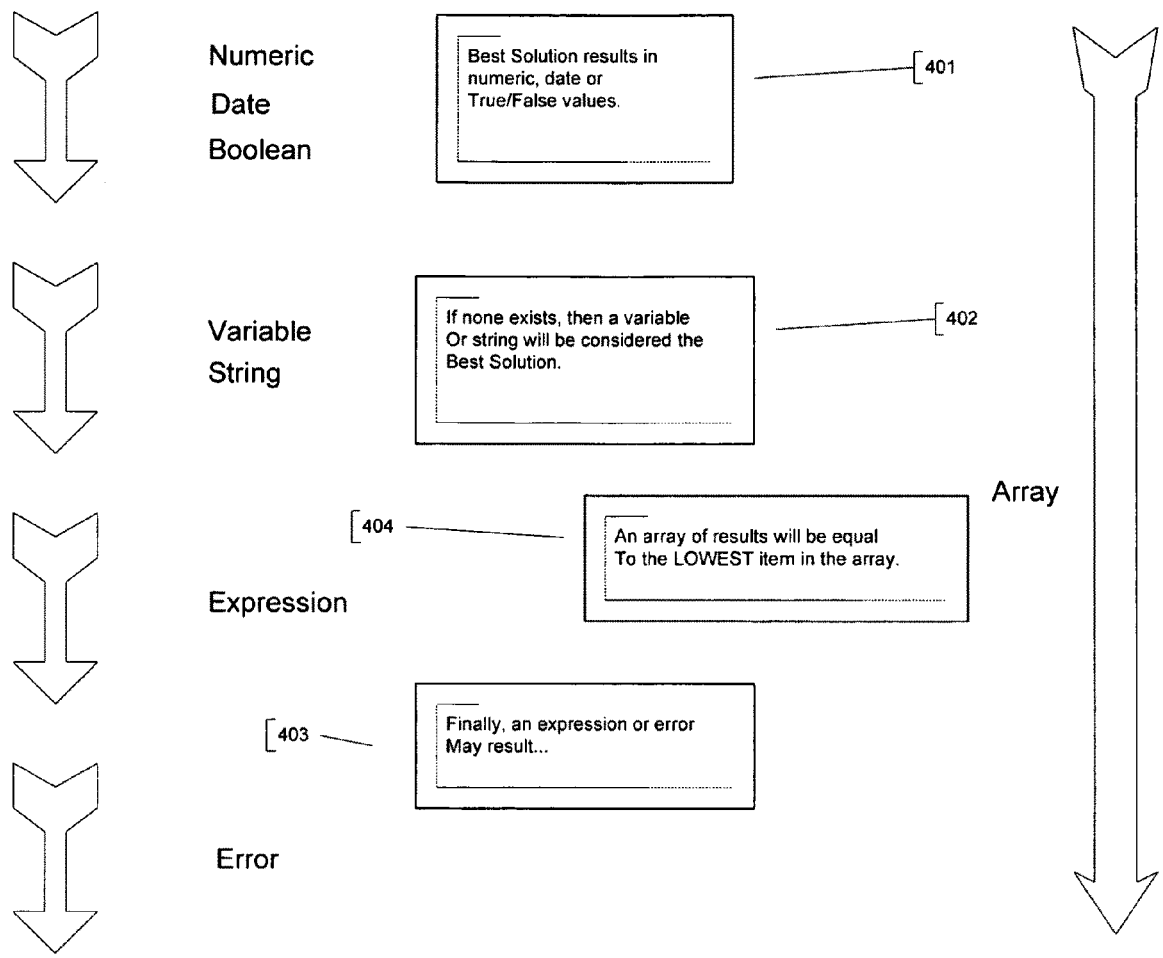
FIG. 4 schematically illustrates priorities used by a rules evaluator for determining a best solution, in accordance with an embodiment of the disclosure.

In an embodiment, the evaluator uses the following priorities, shown schematically in FIG. 4, to determine what results are to be discarded and what results are to be returned: (1) Numeric, date or true/false results 401 are the best; (2) if no results 401 are found, variables or strings 402 will be returned; (3) expressions; and (4), as a lowest priority, error messages 403 will be returned. Arrays of results 404 will take the lowest priority contained in the array; for instance, if one item in the array is an expression, then the entire array is treated like an expression. It should be appreciated that the priority could be modified for specific applications.

According to an embodiment of the disclosure, a system executing computer program code on a computing device presents a user with a general purpose analysis tool suitable for both numerical and logical analyses. The user is provided a blank sheet on which to write rules, or user-defined functions. The user can also import financial, logical and mathematical functions from other programs or databases, or from a list of built-in functions that could be supplied with the technology.

Figure 5:
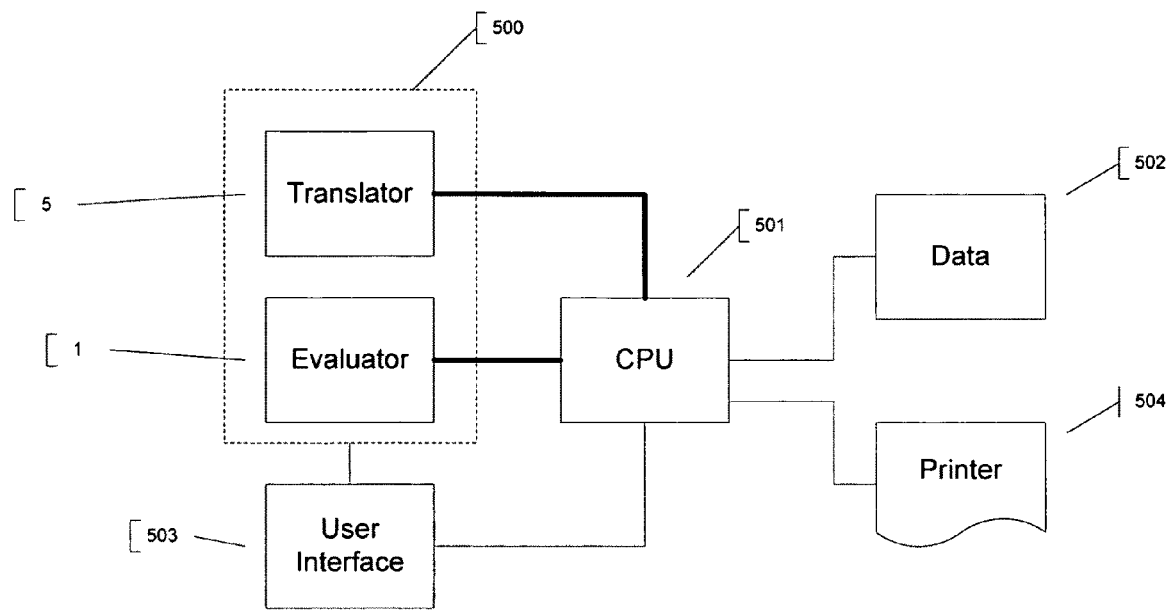
FIG. 5 illustrates a sample application structure.

The technology described above may be created using any modern programming language and operated on a variety of operating systems. Computer program code in accordance with an embodiment of the disclosure can be produced using the Microsoft.net framework. The important components, as shown schematically in FIG. 5, include a main application 500 executing on a CPU 501; application 500 contains the evaluator 1 and the NL translator 5. It will also provide the user interface to any number of rules forms, grid forms, results windows, charts, and other presentation tools. It will be appreciated that the system may be implemented either on a standalone processor or on a network.

Each rules form has the ability to read data from a data source 502 (a database or a memory storage device such as a disk file, etc.), add, edit, and delete rules using the translator, and pass all of the available rules to the evaluator.

The system also includes a user interface 503 to the evaluator. The interface passes queries (user requests for calculations) to the evaluator. The evaluator evaluates the data using the rules, and returns (outputs) the solution and the steps used to determine the solution back to the user. If desired, the steps are displayed in an outline format that the evaluator used to solve the query, including searching for solutions, discarding incomplete solutions, etc.

Each grid (e.g. spreadsheet) maintains definitions for each column (the variable or expression the column is to contain) and the formatting style for each column. When the grid is displayed, each column is evaluated and the results are presented row-by-row or column-by-column. A finished grid is typically also printed using a printer 504.

Other presentation tools may be provided that can accept output from the evaluator and present the results in a variety of layout or graphical tools. For example, the results window may be reformatted to provide a flowchart (rather than an outline) of the solution path.

Example 1

Financial Acquisition Analysis

Here, an acquisition analysis is to be performed by an analyst that may pre-build rules commonly used in all analyses; for instance:

Net Sales=Gross Sales−Cost of Sales
EBITDA=Net Sales−SGA Expense
PreTax Income=EBITDA−Interest Expense−Depreciation Expense When the analyst reviews a new transaction, he may receive data such as Gross Sales, Cost of Sales, etc. For example, Gross Sales={4000, 5000, 6000, 7000}
Cost of Sales=Gross Sales*80%
SGA Expense=1000

These would be input and stored in a rules file. If the user queries "Cost of Sales," the evaluator will search for a definition, and find "Cost of Sales=Gross Sales*80%." The evaluator then tries to solve "Gross Sales*80%" and therefore finds a definition for Gross Sales. When the evaluator finds "Gross Sales={4000, 5000, 6000, 7000}" it solves {4000*80%, 5000*80%, 6000*80%, 7000*80%} which results in {3200, 4000, 4800, 5600}. This is the result returned by the evaluator.

Another group (for example, a research group) might provide other rules files containing data relevant to the current analysis, such as current debt or equity pricing, projected industry information, etc. For example:

Interest Rate=Prime Rate+0.75%

Figure 2:
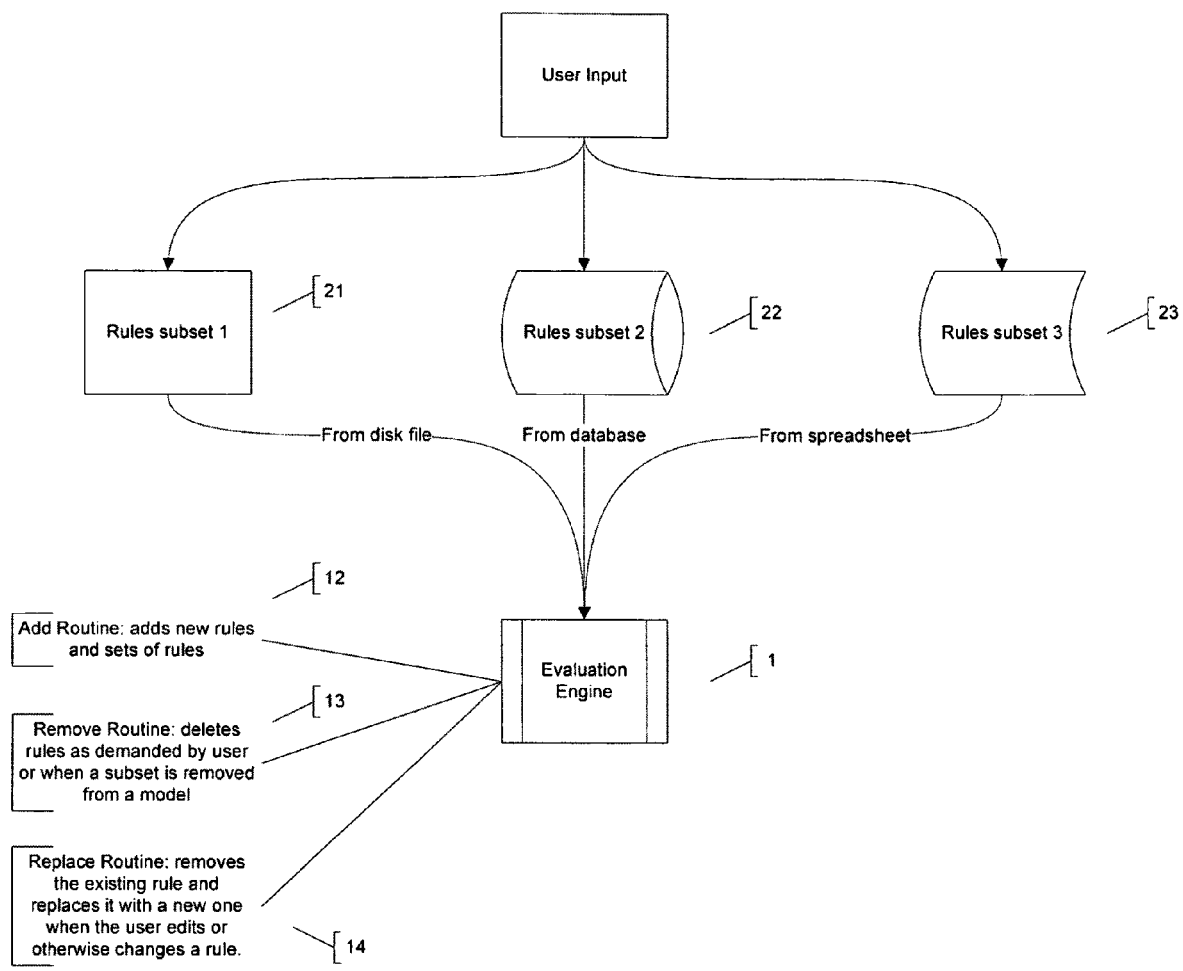
FIG. 2 schematically illustrates a process for inputting, and processing rules using an evaluation engine, in accordance with an embodiment of the disclosure.

The evaluator 1 uses all open files in an analysis, making it very easy to combine rules from different sources (see FIG. 2). In particular, "old" rules applicable to a more general analysis, and "new" rules applicable to the particular problem being solved, may be stored in separate files and combined by the evaluator.

The evaluator 1 includes routines 12, 13, 14 for adding new rules, deleting rules and replacing existing rules with new rules, respectively.

Example 2

Partnership Distribution

In this example, a distribution is calculated in accordance with a partnership allocation model. FIG. 6 shows a computer display screenshot 600 listing sets of rules 601-605; these rules express mathematical relationships governing the distribution. FIG. 7 shows a screenshot 700 with the calculated results 701; the results for each partner are presented in a familiar row-and-column format.

It should be noted that the rules may govern and be called upon for the entire analysis, independent of where they are located, rather than being based on or referenced in a particular cell of the spreadsheet and being dependent on the specific location of the data to be analyzed. Stated another way, the absence of cell-by-cell references allows the rules to be easily incorporated into the analysis. Furthermore, according to the present disclosure, variables are treated as objects, thereby allowing the user the flexibility to structure those objects as needed.

While the grid and charts are the most familiar to users of spreadsheets, separating the evaluation of formulas from the end results allows for greater flexibility in presentations of information. For example, the logic and results may be presented in multiple grids, charts, numerical flow analyses, or the like.

The technologies described here have several significant advantages over spreadsheets in presenting and reporting results. As in a spreadsheet, the evaluator returns the solution to a query. However, the evaluator also provides an outline of the steps taken to reach the solution. This outline acts as a proof of the solution and can be presented in a textual (outline) format; a graphical format; or other formats that are programmed.

Spreadsheet analyses provide only the end result, and calculations that are not shown to the end user are either buried within other calculations, contained in hidden cells or calculated outside the report, each of which causes problems with editing or proofing a model. In an embodiment of the disclosure, rules are output in a logical order, along with the variables relevant to the analysis.

Since the rules contain all of the logic and data related to an analysis, the same results can be used in different reports, such as multiple grids, charts, etc. Since there is no need to copy and edit formulas for a different report, the chance of error is minimized.

The application can also be programmed to maintain historical changes to the rules when a rule is added, deleted or modified, and the file saved. For example, in a preferred embodiment, a checksum is added to the file to ensure that the file has not been modified outside of the application. As a result, protected is provided from a casual or unintended modification of the saved file. The application may also present changes to the user on a rule-by-rule basis, showing the history of a given rule, or on a rules file basis, showing the state of the rules file with each subsequent change.

Although the history of changes to grid files is not stored in the preferred embodiment, such a feature could be included for additional security and recordkeeping.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A computer-implemented method for processing data using natural language relationships, comprising:
   receiving a plurality of natural-language relationships;
   translating said plurality of natural-language relationships to obtain a database of structured rules for input to an evaluator;
   receiving a query from a user requesting analysis of data in accordance with the structured rules input to the evaluator;
   searching the database of structured rules for applicable explicit definitions of a variable;
   evaluating the applicable explicit definitions using the data to obtain one or more solutions and creating a stack of available solutions;
   searching the database of structured rules for the applicable implicit definitions if the applicable explicit definitions do not provide solutions;
   evaluating the applicable implicit definitions using the data to obtain one or more solutions and creating a stack of available solutions;
   selecting one or more best solutions, according to the solution data type, from the stack of available solutions;
   outputting the selected solutions to an output format selected by the user; and
   outputting the structured rules relied upon to obtain the selected solutions to an output format.

2. The method of claim 1, wherein the step of selecting best solutions comprises selecting solutions from the stack of available solutions according to a prioritized order of data types.

3. The method of claim 2 wherein the prioritized order of data types applied in selecting best solutions selects numeric, date and Boolean solutions instead of other available solutions.

4. The method of claim 3 wherein the prioritized order of data types applied in selecting best solutions selects variable and string solutions ahead of other solutions where numeric, date and Boolean solutions are not available.

5. The method of claim 4 wherein the prioritized order of data types applied in selecting best solutions selects expressions ahead of other solutions where numeric, date, Boolean, variable and string solutions are not available.

6. The method of claim 1, wherein the structured rules are input to the evaluator from at least one of a memory or storage device, an existing database, or a spreadsheet.

7. The method of claim 1, wherein the data for evaluation comprises at least one of a variable, an array, a functional expression and a value.

8. The method of claim 7, wherein the value comprises one of a Boolean value, a date, a number, a null, and a string.

9. The method of claim 7, further comprising returning the same value if the data is a value.

10. The method of claim 7, further comprising:
    evaluating each item in the array if the data is an array; and returning an array of results.

11. The method of claim 7, further comprising evaluating each parameter in the functional expression if the data is a. functional expression.

12. The method of claim 11, wherein the functional expression comprises parameters and operators.

13. The method of claim 1, wherein the output format of the solutions is Selected by the user, and selected from the group consisting of a user-defined grid, a graph or a chart.

14. The method of claim 1, wherein the output format of the rules comprises an outline or a flowchart displaying the structured rules in the order applied to determine the solutions.

15. A system for processing data information using natural language relationships, comprising:
    an application module having an evaluator and a translator, wherein said evaluator receives structured rules including descriptive variable names, receives queries requesting analysis of data in accordance with the received structured rules, selects structured rules for evaluation in accordance with the data type, evaluates the selected structured rules using the data to obtain all solutions available, places said solutions in a stack of solutions, and selects solutions to be output from a stack of solutions according to prioritized solution data types;

a processor operatively coupled to the application module;

a database of rule definitions which is operatively coupled to the processor;

an interface operatively coupled to the processor and the application module, said interface passing the queries to the evaluator;

means for outputting the selected solutions to a user in an format selectable by the user; and means for outputting the rules applied in generating the selected solutions to the user in outline format.

16. The system of claim 15, wherein the queries comprise requests for calculations.

17. The system of claim 16, wherein the evaluator calculates the solutions using explicit definitions and the analyzed data, if explicit definitions that provide solutions are available.

18. The system of claim 17, wherein the evaluator calculates the solutions using implicit definitions and the analyzed data, if explicit definitions are not available or do not provide solutions.

19. The system of claim 16, wherein the structured rules are input to the evaluator from one of a memory or storage device, an existing database, a spreadsheet, or manually by a user.

20. The system of claim 15, wherein the evaluator determines a best solution in accordance with prioritized solution data types by returning numeric, date and Boolean solutions if available, variable and string solutions if numeric, date and Boolean solutions are not available, and expressions if numeric, date, Boolean, variable and string solutions are not available.

21. The system of claim 20, wherein the evaluator returns an error message where the solution stack does not include a numeric value, a date, a Boolean value, a variable, a string or an expression.

* * * * *